US009352672B2

(12) United States Patent
Elton

(10) Patent No.: US 9,352,672 B2
(45) Date of Patent: May 31, 2016

(54) INERTIAL LATCH SYSTEM FOR A VEHICLE SEAT

(71) Applicant: Robert Elton, Ann Arbor, MI (US)

(72) Inventor: Robert Elton, Ann Arbor, MI (US)

(73) Assignee: FCA US LLC, Auburn Hills, MI (US)

(*) Notice: Subject to any disclaimer, the term of this patent is extended or adjusted under 35 U.S.C. 154(b) by 74 days.

(21) Appl. No.: 14/231,861

(22) Filed: Apr. 1, 2014

(65) Prior Publication Data
US 2015/0274043 A1 Oct. 1, 2015

(51) Int. Cl.
B60N 2/00 (2006.01)
B60N 2/42 (2006.01)
B60N 2/30 (2006.01)

(52) U.S. Cl.
CPC . *B60N 2/43* (2013.01); *B60N 2/305* (2013.01)

(58) Field of Classification Search
CPC ...... B60N 2/305; B60N 2/4221; B60N 2/433; A47C 7/56; A47C 7/58
USPC .......... 297/331, 332, 333, 335, 216.1, 378.11
See application file for complete search history.

(56) References Cited

U.S. PATENT DOCUMENTS

| 4,045,079 A | 8/1977 | Arlauskas et al. |
| 4,252,370 A | 2/1981 | Kluting et al. |
| 4,294,488 A | 10/1981 | Pickles |
| 4,358,155 A | 11/1982 | Osterhold et al. |
| 4,687,252 A | 8/1987 | Bell et al. |
| 4,756,577 A | 7/1988 | Berg et al. |
| 5,346,281 A | 9/1994 | Hughes |
| 6,164,720 A * | 12/2000 | Haglund .................... 297/216.1 |
| 6,481,799 B1 * | 11/2002 | Whalen ..................... 297/378.11 |
| 6,666,508 B1 * | 12/2003 | Hofmann et al. .......... 297/216.1 |
| 7,374,242 B2 * | 5/2008 | Champ et al. ................. 297/331 |
| 8,376,442 B1 * | 2/2013 | Brantley .................... 296/65.09 |
| 8,752,898 B2 * | 6/2014 | Gleason ................... 297/354.12 |
| 2008/0211281 A1 * | 9/2008 | Grable et al. ................. 297/331 |

* cited by examiner

*Primary Examiner* — David E Allred
*Assistant Examiner* — Alexander Harrison
(74) *Attorney, Agent, or Firm* — Ralph E. Smith

(57) ABSTRACT

An inertial latch system includes a floor bracket, a seat cushion bracket, an inertial weight and an inertial weight damper assembly. The seat cushion bracket is rotatable between a down position, an up position and an intermediate position between the down and up positions. The inertial weight damper assembly is selectively coupled to the inertial weight and includes a detent plunger and a contact plug coupled to the detent plunger. The detent plunger is movable between an extended condition and a retracted condition. In each of the up and down positions, the detent plunger is in the extended condition and inhibits movement of the seat cushion bracket from the up and down positions, respectively, and the contact plug inhibits movement of the inertial weight. In the intermediate position, the detent plunger is in the retracted condition, and the contact plug does not inhibit movement of the inertial weight.

18 Claims, 8 Drawing Sheets

INERTIAL LATCH SYSTEM FOR A VEHICLE SEAT

FIELD

The present disclosure relates generally to a vehicle seat and, more particularly, an inertial latch system for a vehicle seat.

BACKGROUND

A vehicle seat in the rear of a vehicle, e.g., a truck, is typically capable of being moved between an up or stowed position and a down or deployed position. For example, the bottom cushion portion of a truck seat is positioned in either the down position to permit a passenger to sit, or an up position in which the bottom cushion portion is arranged substantially vertically and adjacent to the backrest portion to permit extra cargo to be stored in the cab of the vehicle.

In some cases, an inertial weight is used to inhibit movement of the vehicle seat from the up or down position during a sudden force event (a sudden deceleration, a sudden acceleration, etc.). The inertial weight operates to "lock" the position of the vehicle seat by freely rotating and interacting with a portion of the vehicle seat during sudden force events. Free movement of the inertial weight in all conditions is undesirable due to noise, vibration and harshness (NVH) considerations, so a damper is typically used to inhibit movement (rattling, etc.) of the inertial weight during normal operating conditions. Known dampers are difficult to assemble, and add extra weight and cost to the vehicle seat. Thus, while such dampers work for their intended purpose, there remains a need for improvement in the relevant art.

SUMMARY

In one form, an inertial latch system for a vehicle seat is provided in accordance with the teachings of the present disclosure. In one example implementation, the inertial latch system includes a floor bracket, a seat cushion bracket, an inertial weight and an inertial weight damper assembly. The seat cushion bracket is rotatably coupled to the floor bracket, and is rotatable between a down position, an up position and an intermediate position between the down and up positions. The inertial weight is coupled to the floor bracket. The inertial weight damper assembly is selectively coupled to the inertial weight and includes a detent plunger and a contact plug coupled to the detent plunger. The detent plunger is movable between an extended condition and a retracted condition. In each of the up and down positions, the detent plunger is in the extended condition and inhibits movement of the seat cushion bracket from the up and down positions, respectively, and the contact plug inhibits movement of the inertial weight. In the intermediate position, the detent plunger is in the retracted condition, and the contact plug does not inhibit movement of the inertial weight.

In another form, a vehicle seat is provided in accordance with the teachings of the present disclosure. In one example implementation, the vehicle seat includes a floor bracket, a seat cushion bracket rotatably coupled to the floor bracket, an inertial weight, and an inertial weight damper assembly. The floor bracket defines a plunger aperture. The seat cushion bracket is rotatable between a down position, an up position and an intermediate position between the down and up positions, the seat cushion bracket defining at least two indentations. The inertial weight is coupled to the floor bracket.

In accordance with an aspect of the present disclosure, the inertial weight damper assembly includes a damper assembly bracket coupled to the floor bracket. In one example implementation, the inertial weight damper assembly further includes a detent plunger arranged within the plunger aperture. The detent plunger is movable between an extended condition and a retracted condition. The inertial weight damper assembly also includes a connecting member having a top end portion and a bottom end portion, a biasing member and a contact plug. The top end portion of the connecting member is coupled to the detent plunger. The biasing member is arranged between the damper assembly bracket and the top end portion of the connecting member, and biases the detent plunger to the extended condition. The contact plug is coupled to the bottom end portion of the connecting member.

In one example implementation, in each of the up and down positions, the detent plunger is in the extended condition and mates with one of the indentations and the contact plug contacts the inertial weight. In the intermediate position, the detent plunger is in the retracted condition by the seat cushion bracket and the contact plug is separated from the inertial weight.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

Figure 1:
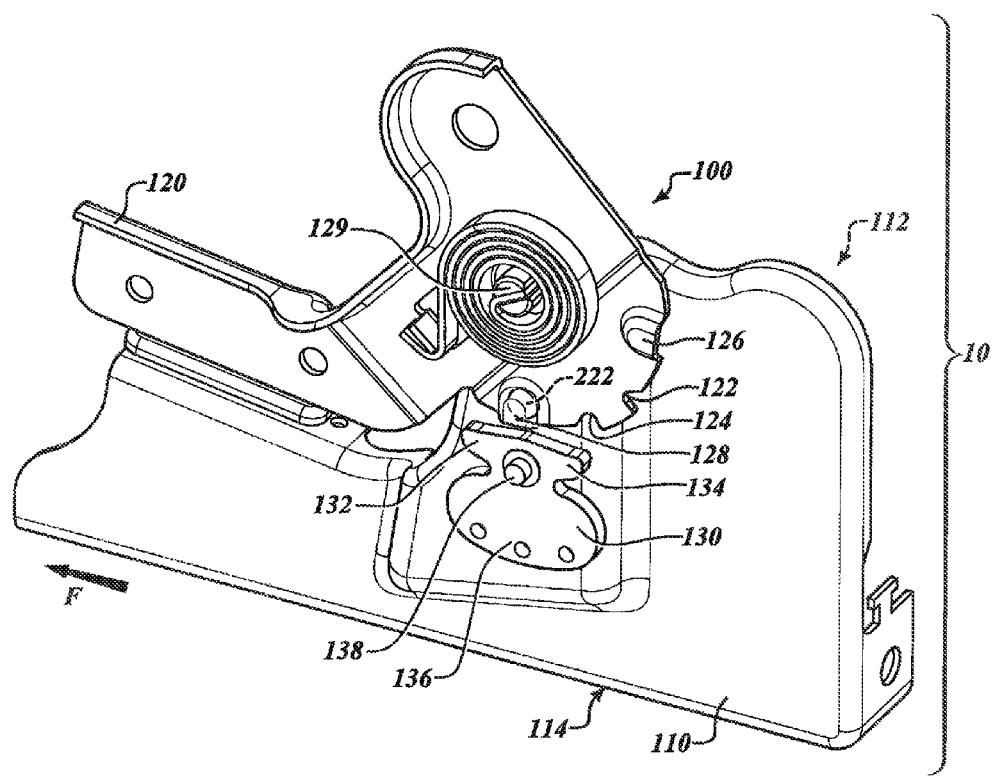
FIG. 1 is a perspective view of an example vehicle seat that includes an inertial latch system in a down position according to the principles of the present disclosure.
Figure 2:
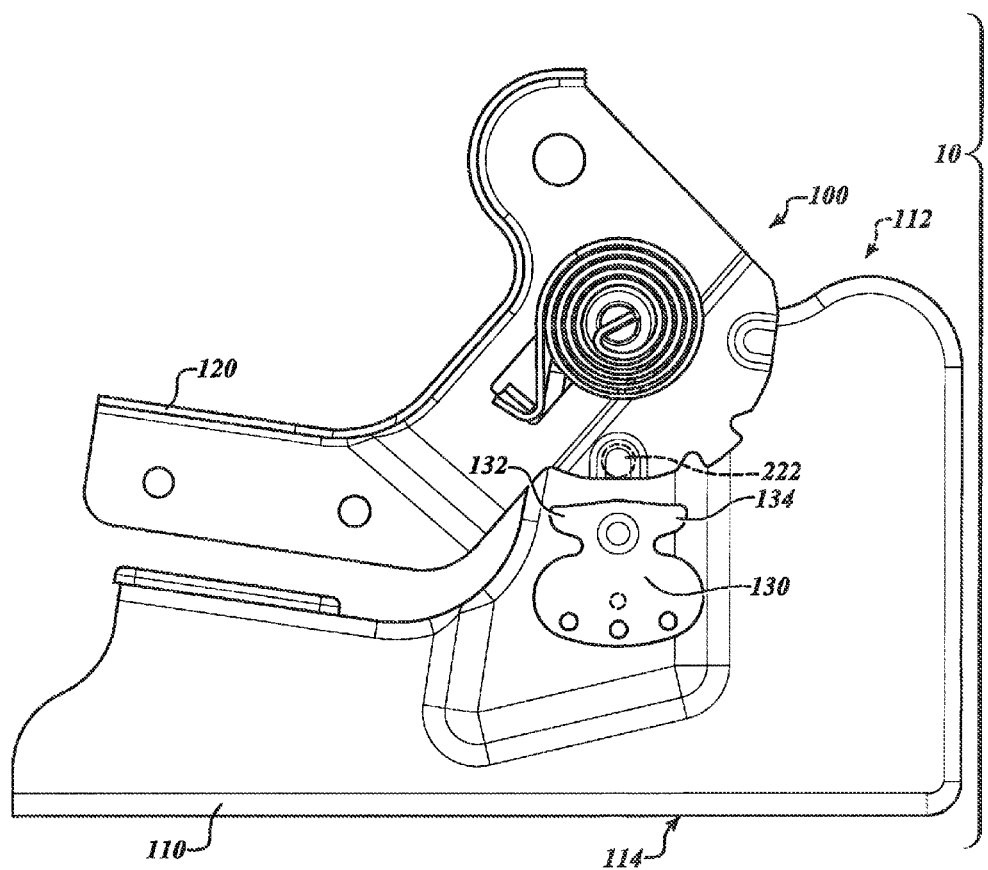
FIG. 2 is a side view of the example vehicle seat of FIG. 1 in a down position.

As mentioned above, an inertial weight is used to inhibit movement of the vehicle seat from the up or down position during a sudden force event. The inertial weight operates to "lock" the position of the vehicle seat by freely rotating and interacting with a portion of the vehicle seat during a sudden force event. Free movement of the inertial weight in all conditions is undesirable due to NVH considerations, so a damper is typically used to inhibit movement of the inertial weight during normal operating conditions.

The present disclosure is directed to a vehicle seat with an improved inertial latch system. The inertial latch system provides a positive stop for the up and down positions of the vehicle seat, while allowing a user to move the vehicle seat between these positions. The inertial latch system also inhibits or arrests the movement (e.g., rattling) of the inertial weight when the vehicle seat is in either the up or down positions. During a sudden force event when the forces operating on the vehicle seat would typically cause it to change position (from up to down, or down to up), the inertial latch system will not inhibit movement of the inertial weight, thereby allowing the inertial weight to act as intended to inhibit the vehicle seat from changing position. The inertial latch system of the present disclosure provides a number of advantages over known alternatives, including, but not limited to, ease of manufacture, a decreased weight and lower cost.

Referring now to FIGS. 1-5, an example vehicle seat 10 that includes an inertial latch system 100 according to some embodiments of the present disclosure is illustrated. The inertial latch system 100 includes a floor bracket 110 and a seat cushion bracket 120. The inertial latch system 100 further includes an inertial weight 130 coupled to the floor bracket 110, and an inertial weight damper assembly 200 (see FIGS. 6-8). The vehicle seat 10 is shown in the Figures to illustrate some of its example components and their operation, but it is contemplated that a vehicle seat 10 according to the principles of the present disclosure will include many additional features and components that are not shown in the Figures.

The floor bracket 110 has an interior side 112 and an opposed exterior side 114. The inertial weight 130 is arranged on one of the interior and exterior sides 112, 114 and the inertial weight damper assembly 200 is arranged on the other one of the interior and exterior sides 112, 114. In the illustrated example, the inertial weight 130 is arranged on the exterior side 114 and the inertial weight damper assembly 200 is arranged on the interior side 112. The floor bracket 110 defines a plunger aperture 116 (see FIGS. 6-7) in which a portion of the inertial weight damper assembly 200 is arranged. The floor bracket 110 further defines a contact plug opening 118 (see FIGS. 6-7) through which another portion of the inertial weight damper assembly 200 is permitted to extend, as described more fully below.

The seat cushion bracket 120 is rotatably coupled to the floor bracket 110. As shown, the seat cushion bracket 120 is rotatable between a down or deployed position (FIGS. 1-2 and 6), an up or stowed position (FIG. 3), and an intermediate position (FIGS. 4-5 and 7) between the down and up positions. It should be appreciated that there are many intermediate positions between the down and up positions, and the present disclosure utilizes the singular term "intermediate position" to describe one or more possible positions of the seat cushion bracket 120.

The seat cushion bracket 120 includes two engagement portions: an up position engagement portion 122 and a down position engagement portion 124. The up position engagement portion 122 and the down position engagement portion 124 are each configured to engage with the inertial weight 130 during a sudden force event to inhibit movement of the seat cushion bracket 120 in the up position (FIG. 3) and the down position (FIG. 1-2), respectively. In some embodiments, the seat cushion bracket 120 also defines at least two indentations: an up position indentation 126 and a down position indentation 128. The indentations 126, 128 can provide a positive stop for the up and down positions of the vehicle seat 10, while allowing a user to move the vehicle seat 10 between these positions. Instead of indentations 126, 128, the seat cushion bracket 120 could define openings, grooves or otherwise be shaped to provide similar functionality.

The inertial weight 130 is coupled to the floor bracket 110, e.g., by a rivet 138 that permits free rotation of the inertial weight 130. The inertial weight 130 includes a body portion 136 and two engagement lobes: an up position engagement lobe 132 and a down position engagement lobe 134. The body portion 136 has a greater mass, and therefore greater inertia, than the engagement lobes 132, 134. As a result, unless the inertial weight 130 is inhibited from moving, movement of the floor bracket 110 during a sudden force event will cause the inertial weight 130 to rotate around the rivet 138 (See FIG. 5). The engagement lobes 132, 134 are configured to engage with the engagement portions 122, 124 of the seat cushion bracket 120 during this rotation, as described more fully below. Other configurations of the inertial weight 130 are contemplated by the present disclosure.

Figure 6:
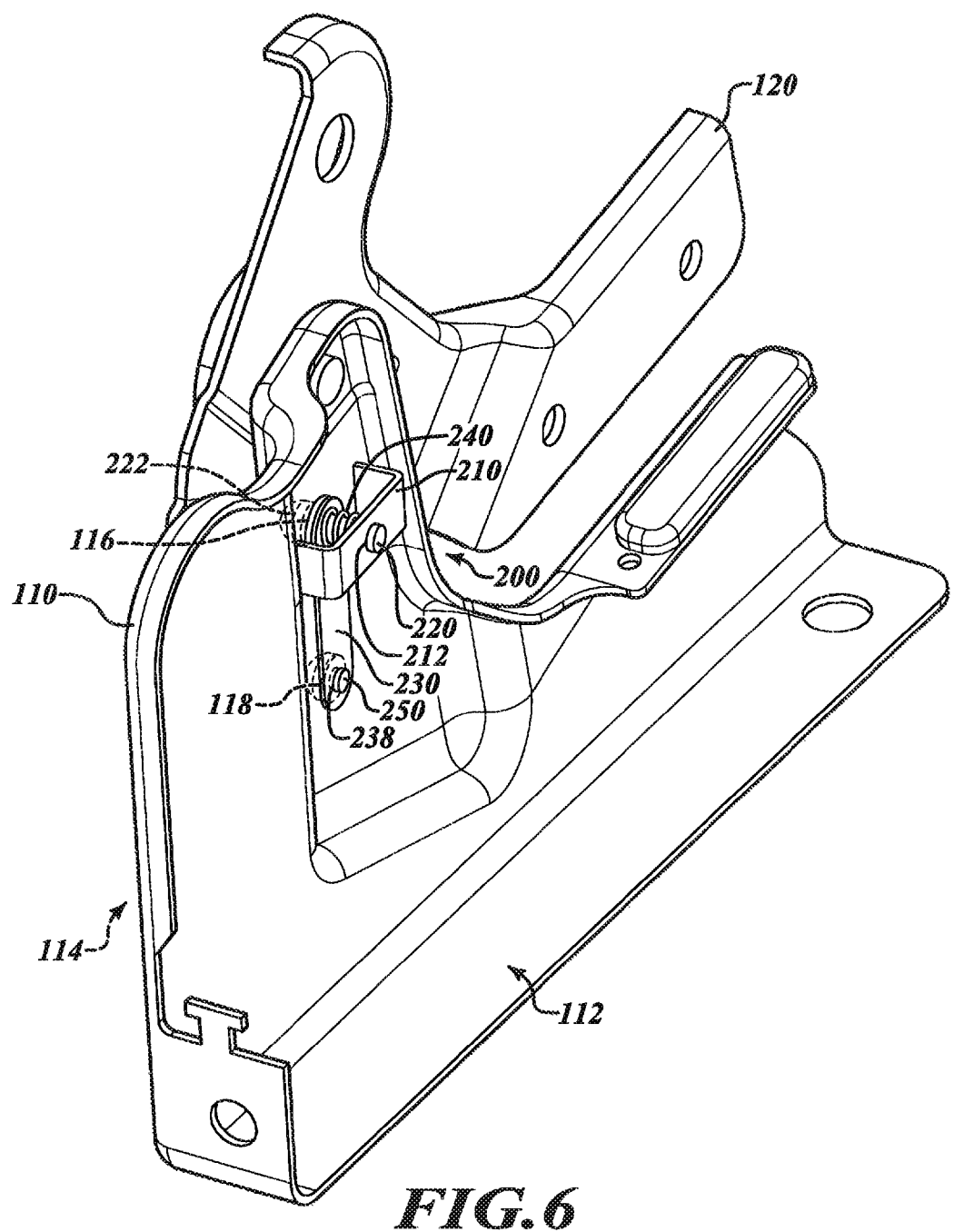
FIG. 6 is a perspective view of an example inertial latch system with a detent plunger in an extended condition according to the principles of the present disclosure.
Figure 7:
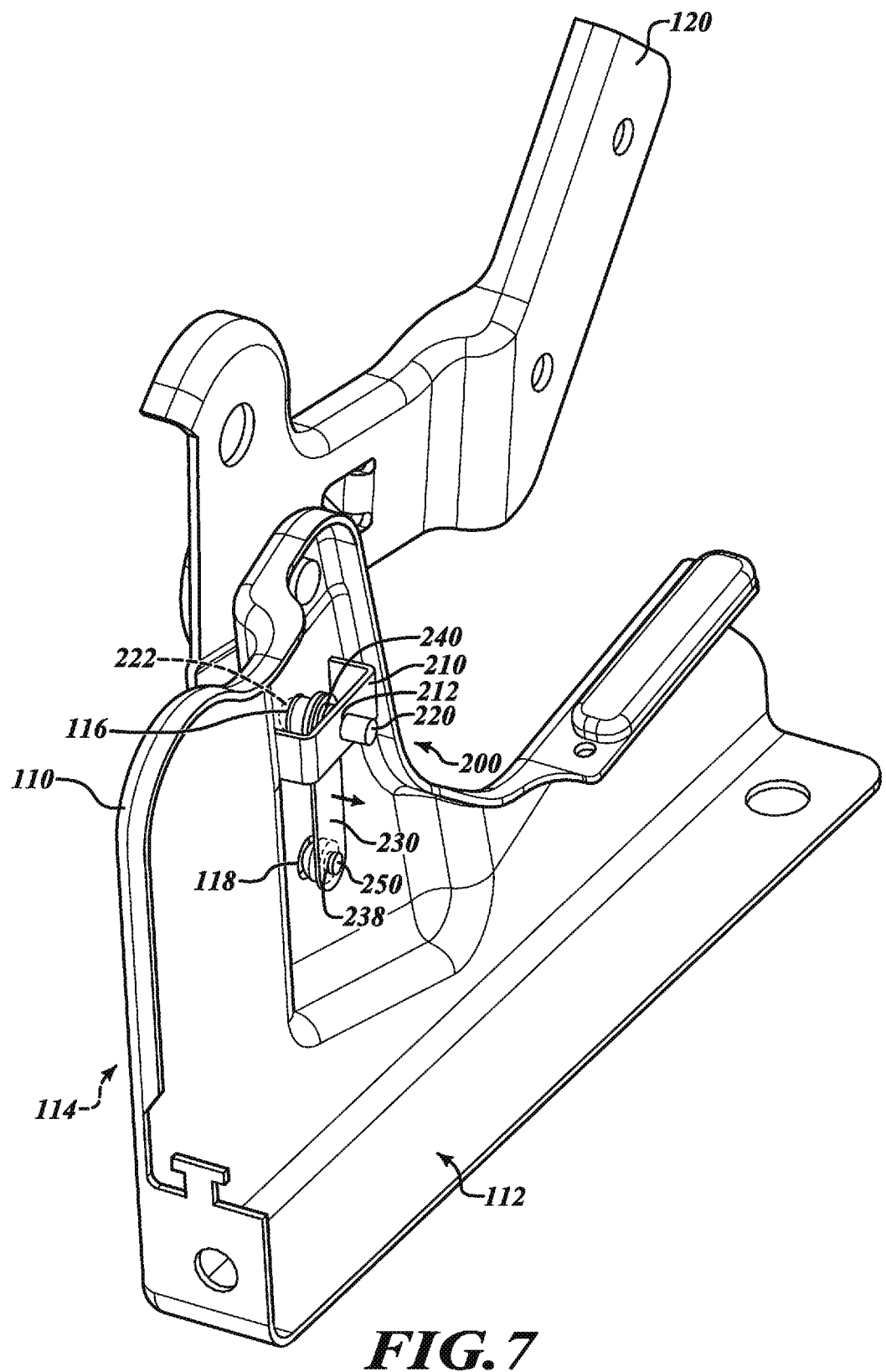
FIG. 7 is a perspective view of the example inertial latch system of FIG. 6 with the detent plunger in a retracted condition.
Figure 8:
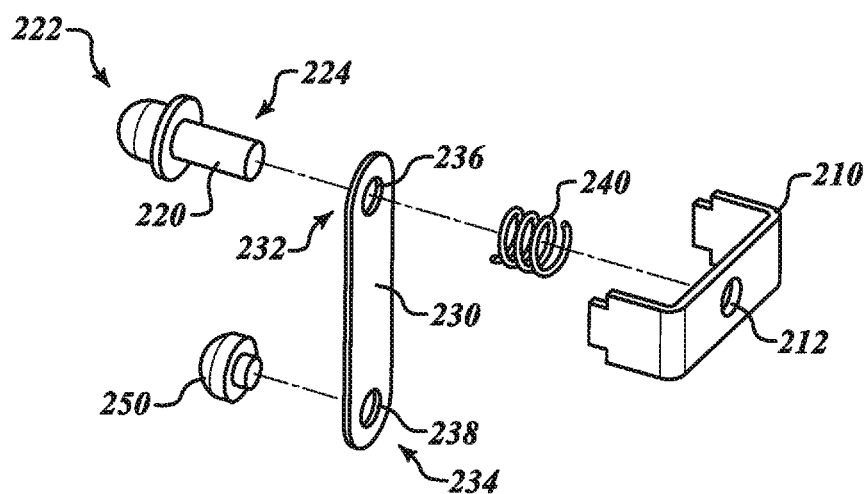
FIG. 8 is an exploded view of the example inertial latch system of FIG. 6.

With further reference to FIGS. 6-8, an example inertial weight damper assembly 200 includes a damper assembly bracket 210, a detent plunger 220, a connecting member 230, a biasing member 240 and a contact plug 250. As described more fully below, the inertial weight damper assembly 200 is selectively coupled to the inertial weight 130. When coupled to the inertial weight 130, the inertial weight damper assembly 200 inhibits movement of the inertial weight 130. Additionally, when the inertial weight damper assembly 200 is not coupled to or in contact with the inertial weight 130, the inertial weight damper assembly 200 does not inhibit movement of the inertial weight 130.

The damper assembly bracket 210 is coupled to the floor bracket 110. For example only, the damper assembly bracket 210 is separate from and fixedly secured (e.g., welded) to the floor bracket 110. Alternatively, the damper assembly bracket 210 could be integrally formed by the floor bracket 110, e.g., be formed as portion of the floor bracket 110. In some embodiments, the damper assembly bracket 210 defines an aperture 212 in which the detent plunger 220 is arranged.

The illustrated detent plunger 220 includes a detent end 222 and an alignment end 224. The detent end 222 is configured to mate with the seat cushion bracket 120, e.g., each of the indentations 126, 128. The alignment end 224 is arranged within the aperture 212 of the damper assembly bracket 210 to assist with proper positioning of the detent plunger 220. Furthermore, the detent plunger 220 is coupled to the connecting member 230, e.g., by extending through an opening 236 defined by the connecting member 230. The detent plunger 220 is movable between an extended condition (FIG. 6) and a retracted condition (FIG. 7). In some embodiments, the detent plunger 220 is arranged within the plunger aperture 116, e.g., to assist with proper positioning of the detent plunger 220 and/or permit the detent end 222 to contact and mate with the seat cushion bracket 120 or the indentations 126, 128, depending on the position of the seat cushion bracket.

The connecting member 230 has a top end portion 232 and a bottom end portion 234. The top end portion 232 is coupled to the detent plunger 220, e.g., by the detent plunger 220 extending through the opening 236. The bottom end portion 234 is coupled to the contact plug 250. For example only, and as shown in the Figures, the contact plug 250 is inserted within an opening 238 defined by the bottom end portion 234 of the connecting member 230. The connecting member 230 acts to couple the detent plunger 220 to the contact plug 250.

In this manner, movement of the detent plunger 220 (e.g., from the extended condition to the retracted condition, and vice-versa) results in corresponding movement of the contact plug 250.

Figure 4:
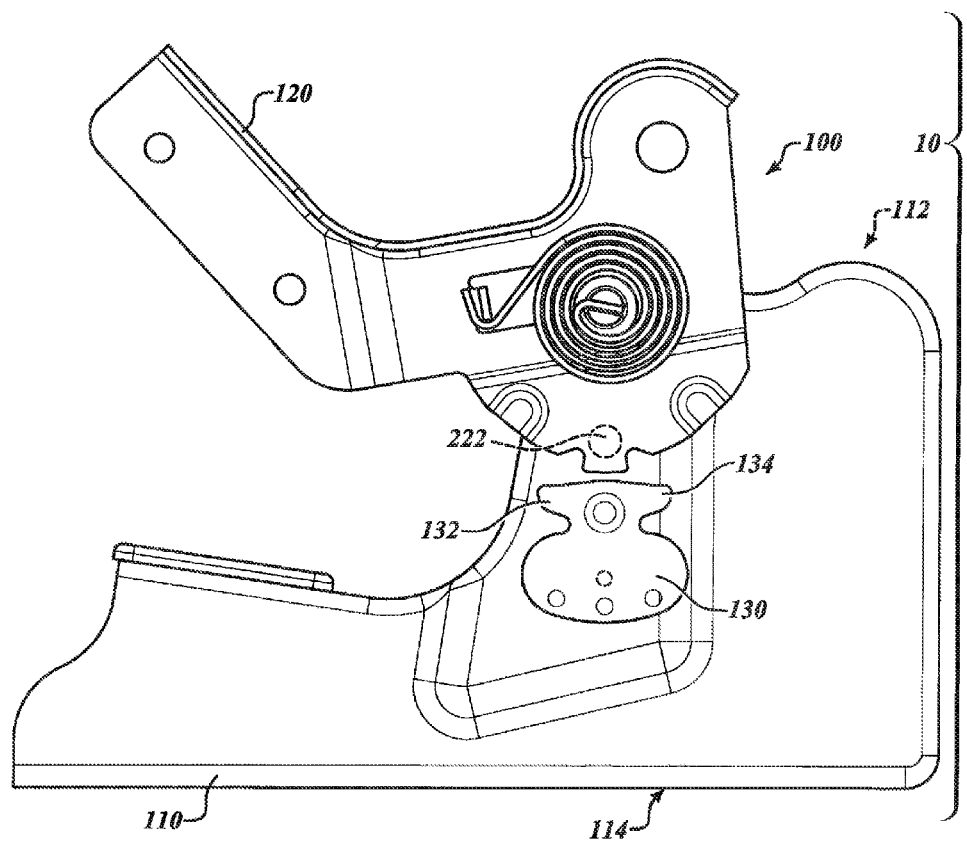
FIG. 4 is a side view of the example vehicle seat of FIG. 1 in an intermediate position.
Figure 5:
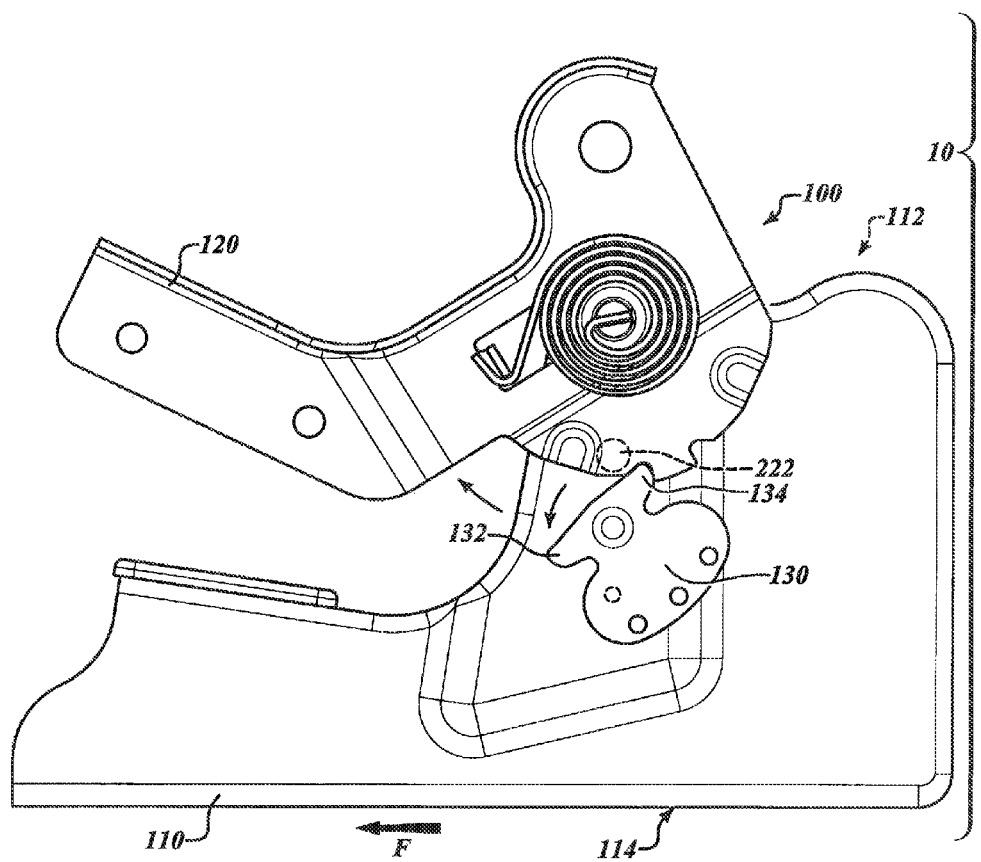
FIG. 5 is a side view of the example vehicle seat of FIG. 1 entering an intermediate position from the down position during a sudden force event.

The biasing member 240 is arranged between the damper assembly bracket 210 and the top end portion 232 of the connecting member 230. The biasing member 240 biases the detent plunger 220 to be in the extended condition and (because the contact plug 250 is coupled to the detent plunger 220) further biases the contact plug 250 to inhibit movement of the inertial weight 130. When the seat cushion bracket 120 is in the intermediate position as shown in FIGS. 4-5, the biasing member 240 is compressed. For example only, the seat cushion bracket 120 contacts and urges the detent plunger 220 to the retracted condition, thereby compressing the biasing member 240. In the up and down positions, the biasing member 240 biases the detent plunger 220 to be in the extended condition and mate with the up position indentation 126 and the down position indentation 128, respectively. While the biasing member 240 is illustrated as a spring, other types of biasing members are also suitable for use with the present disclosure.

Figure 3:
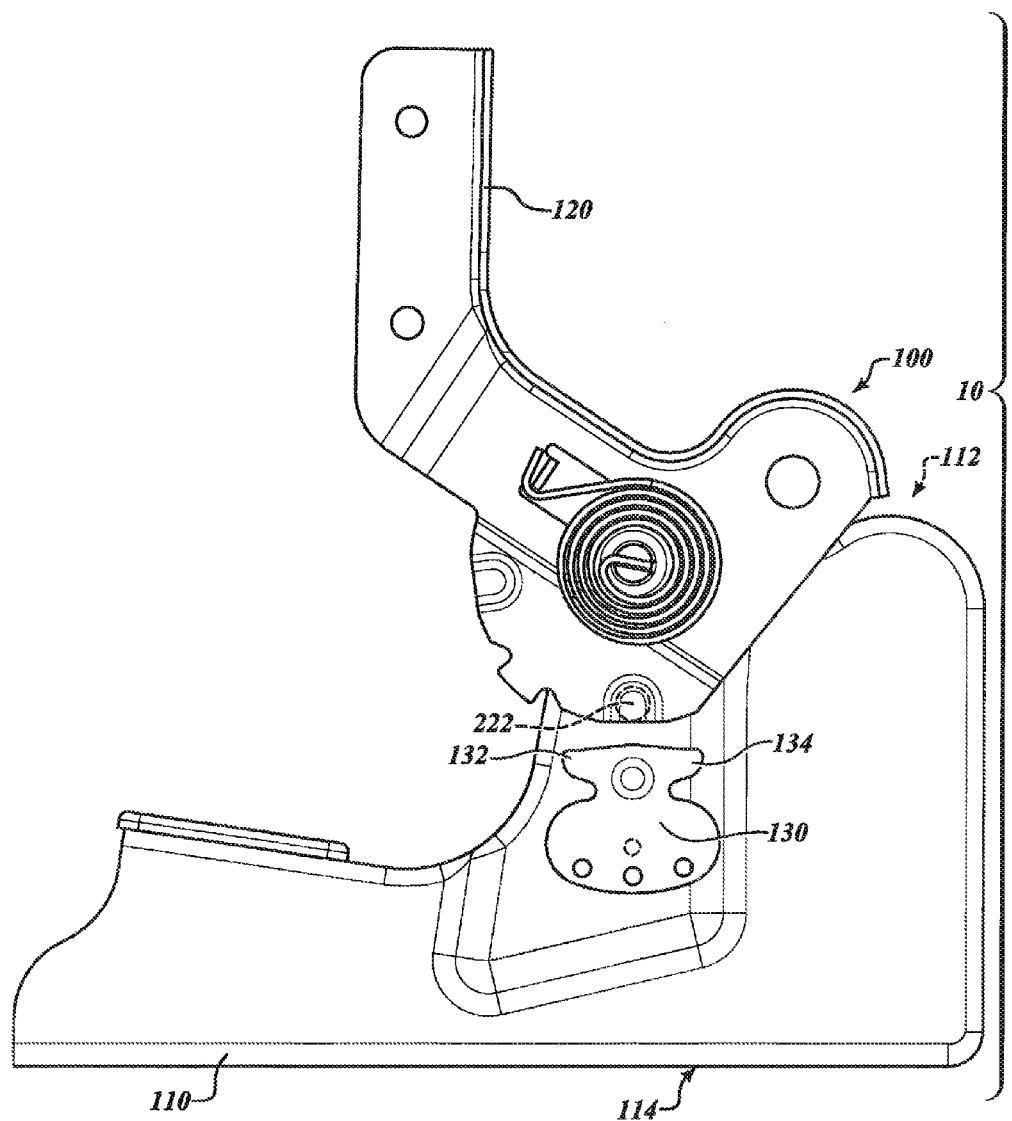
FIG. 3 is a side view of the example vehicle seat of FIG. 1 in an up position.

The contact plug 250 operates to inhibit movement of the inertial weight 130 during normal operating conditions. The contact plug 250 extends from the side on which the inertial weight damper assembly 200 is arranged to the other side on which the inertial weight 130 is arranged, e.g., by extending through the contact plug aperture 118 defined by the floor bracket 110. The contact plug 250 contacts the inertial weight 130 in each of the down position (FIGS. 1-2) and the up position (FIG. 3). In the intermediate position, however, the contact plug 250 is separated from the inertial weight 130, thereby not inhibiting movement (e.g., swinging or rotation) and allowing the inertial weight 130 to freely move and engage one of the engagement portions 122, 124 of the seat cushion bracket 120 during a sudden force event, as shown in FIG. 5. In various embodiments, the contact plug 250 is made of a compliant material, such as rubber, plastic or other similar material, to assist in inhibiting movement of the inertial weight 130 and to reduce noise resulting from the contact between the contact plug 250 and inertial weight 130.

The inertial latch system 100 of the present disclosure operates as follows. As mentioned above, the inertial weight damper assembly 200 inhibits movement (rattling, etc.) of the inertial weight 130 during normal operating conditions, while also permitting (e.g., not inhibiting) free movement of the inertial weight 130 during a sudden force event. During normal operating conditions, the seat cushion bracket 120 will be in either the down position shown in FIGS. 1-2 or the up position of FIG. 3. Furthermore, the detent plunger 220 will be in the extended condition as shown in FIG. 4, and the detent plunger 220 (specifically, the detent end 222) will mate with seat cushion bracket 120 (e.g., one of the indentations 126, 128) to provide a positive stop.

Unintended rotation of the seat cushion bracket 120 could occur during a sudden force event, causing the seat cushion bracket 120 to move to the intermediate position shown in FIG. 5. For example only, with the seat cushion bracket 120 in the down position shown in FIGS. 1-2, when a sudden acceleration occurs the floor bracket 110 will move forward (in the direction shown by arrow F). Due to inertia, the seat cushion bracket 120 will tend to rotate around a pivot point 129 and, if the force associated with the sudden acceleration is sufficient to overcome the positive stop (e.g., from the down position indentation 128), the seat cushion bracket 120 will begin to rotate upwardly and enter the intermediate position.

As the seat cushion bracket 120 rotates and enters the intermediate position, the detent plunger 220 will move to the retracted condition shown in FIG. 7. For example only, the seat cushion bracket 120 will contact the detent plunger 220 (specifically, the detent end 222) to compress the biasing member 240. The movement of the detent plunger 220 will cause the contact plug 250 to move out of contact with the inertial weight 130. In this manner, the contact plug 250 will not inhibit movement of the inertial weight 130, thereby allowing the inertial weight to freely move, e.g., rotate. As the inertial weight 130 rotates, the down position engagement lobe 134 is brought into engagement with the down position engagement portion 124 of the seat cushion bracket 120 as shown in FIG. 5, thereby inhibiting further rotation of the seat cushion bracket 120. A similar process, mutatis mutandis, occurs during a sudden force event when the seat cushion bracket 120 is in the up position.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. An inertial latch system for a vehicle seat, comprising:
a floor bracket;
a seat cushion bracket rotatably coupled to the floor bracket, the seat cushion bracket being rotatable between a down position, an up position and an intermediate position between the down and up positions;
an inertial weight coupled to the floor bracket; and
an inertial weight damper assembly selectively coupled to the inertial weight, the inertial weight damper assembly including:
a detent plunger movable between an extended condition and a retracted condition, and
a contact plug coupled to the detent plunger,
wherein in each of the up and down positions, the detent plunger is in the extended condition and inhibits movement of the seat cushion bracket from the up and down positions, respectively, and the contact plug inhibits movement of the inertial weight,
wherein in the intermediate position, the detent plunger is in the retracted condition, and the contact plug does not inhibit movement of the inertial weight, and
wherein, in each of the up and down positions, the contact plug contacts the inertial weight.

2. The inertial latch system of claim 1, wherein, in the intermediate position, the contact plug is separated from the inertial weight.

3. The inertial latch system of claim 1, wherein the inertial weight damper assembly further includes a biasing member that biases the detent plunger to the extended condition and that biases the contact plug to inhibit movement of the inertial weight.

4. The inertial latch system of claim 3, wherein, in the intermediate position, the seat cushion bracket contacts the detent plunger such that the biasing member is compressed, the detent plunger is in the retracted position, and the contact plug does not inhibit movement of the inertial weight.

5. The inertial latch system of claim 1, wherein the contact plug is formed of a plastic or rubber material.

6. The inertial latch system of claim 1, wherein the seat cushion bracket defines at least two indentations, the detent plunger mating with one of the indentations in each of the up and down positions.

7. The inertial latch system of claim 1, wherein:
the floor bracket has an interior side and an opposed exterior side;
the inertial weight damper assembly is arranged on one of the interior and exterior side; and
the inertial weight is arranged on the other one of the interior and exterior side.

8. The inertial latch system of claim 7, wherein the contact plug extends from the one of the interior and exterior side to the other one of the interior and exterior side.

9. The inertial latch system of claim 8, wherein, in each of the up and down positions, the contact plug extends through a contact plug opening defined by the floor bracket.

10. A vehicle seat, comprising:
a floor bracket defining a plunger aperture;
a seat cushion bracket rotatably coupled to the floor bracket, the seat cushion bracket being rotatable between a down position, an up position and an intermediate position between the down and up positions, the seat cushion bracket defining at least two indentations;
an inertial weight coupled to the floor bracket; and
an inertial weight damper assembly including:
a damper assembly bracket coupled to the floor bracket,
a detent plunger arranged within the plunger aperture, the detent plunger being movable between an extended condition and a retracted condition,
a connecting member having a top end portion and a bottom end portion, the top end portion being coupled to the detent plunger,
a biasing member arranged between the damper assembly bracket and the top end portion of the connecting member, the biasing member biasing the detent plunger to the extended condition, and
a contact plug coupled to the bottom end portion of the connecting member,
wherein:
in each of the up and down positions, the detent plunger is in the extended condition and mates with one of the indentations, and the contact plug contacts the inertial weight, and
in the intermediate position, the detent plunger is in the retracted condition by the seat cushion bracket, and the contact plug is separated from the inertial weight.

11. The vehicle seat of claim 10, wherein the floor bracket further defines a contact plug aperture, the contact plug extending through the contact plug aperture when the contact plug contacts the inertial weight.

12. The vehicle seat of claim 10, wherein the top end portion of the connecting member defines an opening in which the detent plunger is arranged.

13. The vehicle seat of claim 10, wherein movement of the inertial weight is inhibited by the inertial weight damper assembly in each of the up and down positions.

14. The vehicle seat of claim 10, wherein movement of the inertial weight is not inhibited by the inertial weight damper assembly in the intermediate position.

15. The vehicle seat of claim 10, wherein the damper assembly bracket is separate from and fixedly secured to the floor bracket.

16. The vehicle seat of claim 10, wherein the damper assembly bracket is integrally formed by the floor bracket.

17. The vehicle seat of claim 10, wherein:
the floor bracket has an interior side and an opposed exterior side;
the inertial weight damper assembly is arranged on one of the interior and exterior side; and
the inertial weight is arranged on the other one of the interior and exterior side,
wherein, in each of the up and down positions, the contact plug extends from the one of the interior and exterior side to the other one of the interior and exterior side through a contact plug opening defined by the floor bracket.

18. The vehicle seat of claim 10, wherein, in each of the up and down positions, the contact plug extends through a contact plug opening defined by the floor bracket.

* * * * *